United States Patent
Desjardins et al.

(10) Patent No.: US 8,273,449 B2
(45) Date of Patent: Sep. 25, 2012

(54) POLYETHYLENE FILMS AND METHOD OF MAKING THE SAME

(75) Inventors: Sylvie Desjardins, Lake Jackson, TX (US); Marc A. Springs, Angleton, TX (US); Phillip D. Hustad, Manvel, TX (US); Nathan J. Wiker, Houston, TX (US); Jesus Nieto, Cambrils (ES); Wayde V. Konze, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 369 days.

(21) Appl. No.: 12/594,963

(22) PCT Filed: Apr. 4, 2008

(86) PCT No.: PCT/US2008/059338
§ 371 (c)(1),
(2), (4) Date: Oct. 7, 2009

(87) PCT Pub. No.: WO2008/124557
PCT Pub. Date: Oct. 16, 2008

(65) Prior Publication Data
US 2010/0119793 A1    May 13, 2010

Related U.S. Application Data

(60) Provisional application No. 60/922,764, filed on Apr. 10, 2007.

(51) Int. Cl.
*C08F 210/02* (2006.01)
*B32B 27/32* (2006.01)

(52) U.S. Cl. .......... 428/219; 526/348; 526/348.2; 526/124.2; 264/177.1

(58) Field of Classification Search .......... 428/219; 526/348, 348.2, 124.2; 264/177.1
See application file for complete search history.

(56) References Cited

U.S. PATENT DOCUMENTS

2007/0260016 A1 * 11/2007 Best et al. .......... 525/240

* cited by examiner

*Primary Examiner* — Robert D. Harlan

(57) ABSTRACT

The instant invention is a polyethylene film, and method of making the same. The polyethylene film according to instant invention includes at least one heterogeneously branched ethylene/α-olefin copolymer having a density in the range of about 0.910 to about 0.930 g/cm³, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8. The film has a normalized dart impact strength of equal or greater than (6666-7012*density) g/mil, a normalized tear strength of equal or greater than $(440*e-(density-0.915)^2/2*(0.00949)^2)$ g/mil, and a haze in the range of 3 to 10 percent. The method of making the polyethylene film according to instant invention includes the following steps: (1) providing at least one heterogeneously branched ethylene/α-olefin copolymer having a density in the range of about 0.910 to about 0.930 g/cm³, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8; (2) processing the heterogeneously branched ethylene/α-olefin copolymer via blown film extrusion process or cast film extrusion process; and (3) thereby forming a film having a normalized dart impact strength of equal or greater than (6666-7012*density) g/mil, a normalized tear strength of equal or greater than $(440*e-(density-0.915)^2/2*(0.00949)^2)$ g/mil, and a haze in the range of 3 to 10 percent.

10 Claims, No Drawings

POLYETHYLENE FILMS AND METHOD OF MAKING THE SAME

CROSS-REFERENCE TO RELATED APPLICATIONS

This application is a non-provisional application claiming priority from the U.S. Provisional Patent Application No. 60/922,764, filed on Apr. 10, 2007, entitled "POLYETHYLENE FILMS AND METHOD OF MAKING THE SAME," the teachings of which are incorporated by reference herein, as if reproduced in full hereinbelow.

FIELD OF INVENTION

The instant invention relates to polyethylene films, and method of making the same.

BACKGROUND OF THE INVENTION

The use of polyethylene to produce films suitable for a variety of commercial products is generally well known. Different methods may be employed to form such polyethylene films. Such methods include, but are not limited to, extrusion-blown film process, and extrusion-cast film process. Each process has its own advantages and disadvantages. The main difference between these two processes is the manner of cooling an extruded sheet of molten polymer.

The extrusion-blown film process is a well know process for preparation of plastic films. The extrusion-blown film process employs an extruder which heats, melts, and conveys the molten polymer and forces it through an annular die. The molten polymer is drawn from the die and formed into a tube shape morphology and eventually passed through a pair of draw or nip rollers. Internal compressed air is then introduced from the mandrel causing the tube to increase in diameter thereby forming a bubble of a desired size. External air is also introduced around the bubble circumference to cool the melt as it exits the die. Film width is typically varied by introducing more or less internal air into the bubble thus increasing or decreasing the bubble size. Film thickness is typically controlled by increasing or decreasing the speed of the draw roll or nip roll to control the draw-down rate. The bubble is then collapsed into two doubled layers of film immediately after passing through the draw or nip rolls. The cooled film can then be processed further by cutting or sealing to produce a variety of consumer products.

Furthermore, film properties may be influenced by both the molecular structure of the polymer and/or by the processing conditions, e.g. blow up ratio, i.e. the ratio of the diameter of the blown bubble to the diameter of the annular die.

Improved film properties such as improved optical properties and improved mechanical properties are clearly desirable for a variety of applications. Different techniques have been proposed to achieve such improved properties.

U.S. Pat. No. 4,346,834 discloses blended polyolefin resins for making seamless-wall handled strap bags from thin tubular film consisting essentially of a homogeneous blend of HDPE, LLDPE, and ordinary branched LDPE.

U.S. Pat. No. 4,377,720 discloses a process for preparing linear alpha olefins and waxes having a total product $M_n$ in the range 200 to 700 comprising at least 90 mole percent linear alpha olefins which includes polymerizing an ethylene containing gas in the presence of the reaction product of a zirconium halide compound with an aluminum cocatalyst selected from the group consisting of dialkyl aluminum alkoxides or aryloxides and dialkyl aluminum disubstituted amides in the presence of a diluent at a temperature of about 50° to 200° C. and an ethylene pressure above about 3.5 MPa, wherein the $M_n$ of the reaction product is controlled by the molar ratio of the aluminum cocatalyst/Zr halide, and the molar ratio being less than about 1.

U.S. Pat. No. 4,533,578 discloses a 3-ply trash bag prepared by a sandwich foam, blown film co-extrusion process. The skin layers are composed essentially of high performance polyolefins such as linear low density polyethylene. The foamed middle layer imparts to the bag improved structural integrity and stiffness, an independent tear mechanism for the skin layers, and improved TD tear strength.

U.S. Pat. No. 4,579,912 discloses that linear low density copolymers (LLDPE) are blended with up to about 10 weight percent of an aromatic polymer, e.g., polystyrene or poly (para-methylstyrene), to give films having improved MD tear strength or equivalent MD tear strength and higher stiffness compared to the LLDPE alone.

U.S. Pat. No. 4,614,764 discloses that the properties of linear ethylene polymers, especially linear low density polyethylene (LLDPE), are improved by adding a chemically modified ethylene polymer to the base resin. The modification is brought about by the use of a free radical generator, preferably, an organic peroxy compound such as benzoyl peroxide, optionally with an unsaturated silane such as vinyl trimethoxy silane.

U.S. Pat. No. 4,657,811 discloses a three-ply plastic film prepared by a sandwich foam, blown film co-extrusion process. The outer skin layers are composed of high performance polyolefins, such as linear low density polyethylene. The foamed middle layer imparts to the film improved structural integrity and stiffness, an independent tear mechanism for the skin layers, and improved TD tear strength.

U.S. Pat. No. 4,716,201 discloses that linear low density copolymers (LLDPE) are blended with up to about 10 weight percent of an aromatic polymer, e.g., polystyrene or poly (para-methylstyrene), to give films having improved MD tear strength or equivalent MD tear strength and higher stiffness compared to the LLDPE alone.

U.S. Pat. No. 5,000,992 discloses a plastic container closure, such as a bottle cap liner or tamper evident seal, which is formed from a co-extruded multilayer foamed film. The co-extruded multilayer foamed film has at least one solid film layer of a first polyolefin blend containing linear low density polyethylene, low density polyethylene, and optionally high density polyethylene, and at least one foamed layer of a second polyolefin blend containing linear low density polyethylene, low density polyethylene, and optionally ethylene vinyl acetate.

U.S. Pat. No. 5,210,167 discloses a film of linear low density copolymer of ethylene having an $M_z/M_w$ ratio of greater than 3.5.

U.S. Pat. No. 5,258,463 discloses a film formed from a blend composition comprising a linear low density copolymer of ethylene and a minor amount of an olefin containing 4 to 10 carbon atoms.

U.S. Pat. No. 5,569,693 discloses a stretch/cling film suitable for pallet wrap, produced by a blown film process. This film is produced by blending 40 to 80% by weight of linear low density polyethylene polymerized with an alpha-olefin comonomer having a melt index range of 0.8 to 1.2 and a density range of 0.916 to 0.920; with 60 to 20% by weight of a flexible semi-crystalline polyethylene with a melt index of 0.8 to 2.0 and a density of 0.86 to 0.91; with 3 to 9% by weight of liquid polyolefin and 0.1 to 4.0% by weight of a surfactant.

U.S. Pat. No. 6,204,335 discloses a film produced from a composition comprising about 80 to about 99 weight percent, based on the composition, of a linear ultra low density polyethylene and about 1 to about 20 weight percent, based on the composition, of a propylene polymer comprising 0 to about 40 weight percent olefin comonomer units having 2 to 10 carbon atoms and from about 60 to about 100 weight percent propylene, based on the propylene polymer, the propylene polymer having a Brookfield Thermosel viscosity of about 1 to about 30,000 mPa·s at 190° C.

U.S. Pat. No. 6,340,532 discloses shrink films manufactured from pseudohomogeneous linear low density polyethylene resin. The pseudohomogeneous resins are prepared with a Ziegler Natta catalyst, preferably in medium pressure solution polymerization process.

U.S. Pat. No. 6,500,901 discloses a film produced from a composition comprising about 80 to about 99 weight percent, based on the weight of the composition, of a linear ultra low density polyethylene and about 1 to about 20 weight percent, based on the weight of the composition, of a propylene polymer comprising 0 to about 40 weight percent olefin comonomer units having 2 to 10 carbon atoms and from about 60 to about 100 weight percent propylene, based on the propylene polymer.

U.S. Pat. No. 6,696,166 discloses a plastic film prepared from a pseudohomogeneous linear low density polyethylene resin under specific extrusion conditions using a specific annular extrusion die.

U.S. Pat. No. 6,767,599 discloses a process for making pouches filled with a flowable material, using a vertical form, fill and seal apparatus, wherein the pouch is made from a blown film formed from a blend comprising a linear polymer of ethylene with at least one $C_4$-$C_{10}$ alpha-olefin manufactured in a single-site catalyst polymerization process, and at least one of the following (a) a linear polymer of ethylene with at least one $C_4$-$C_{10}$ alpha-olefin made by a multi-site catalyst polymerization process; (b) a high pressure low density polyethylene; and (c) additives selected from the group consisting of stabilizers, antiblock additives and extrusion aids.

Despite the research efforts in developing polyethylene films with improved properties such as improved mechanical properties and/or improved optical properties, there is still a need for new polyethylene films having both improved mechanical properties and improved optical properties, and method of making the same.

SUMMARY OF THE INVENTION

The instant invention is a polyethylene film, and method of making the same. The polyethylene film according to instant invention includes at least one heterogeneously branched ethylene/α-olefin copolymer having a density in the range of about 0.910 to about 0.930 g/cm³, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8. The film has a normalized dart impact strength of equal or greater than (6666-7012*density) g/mil, a normalized tear strength of equal or greater than $$\left(440 * e^{\frac{-(density-0.915)^2}{2*(0.00949)^2}}\right)$$

g/mil, and a haze in the range of 3 to 10 percent. The method of making the polyethylene film according to instant invention includes the following steps: (1) providing at least one heterogeneously branched ethylene/α-olefin copolymer having a density in the range of about 0.910 to about 0.930 g/cm³, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8; (2) processing the heterogeneously branched ethylene/α-olefin copolymer via blown film extrusion process or cast film extrusion process; and (3) thereby forming a film having a normalized dart impact strength of equal or greater than (6666-7012*density) g/mil, a normalized tear strength of equal or greater than $$\left(440 * e^{\frac{-(density-0.915)^2}{2*(0.00949)^2}}\right)$$

g/mil, and a haze in the range of 3 to 10 percent.

DETAILED DESCRIPTION OF THE INVENTION

The polyethylene film according to instant invention includes at least one heterogeneously branched ethylene/α-olefin copolymer having a density in the range of about 0.910 to about 0.930 g/cm³, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8. The film has a normalized dart impact strength of equal or greater than (6666-7012*density) g/mil, a normalized tear strength of equal or greater than $$\left(440 * e^{\frac{-(density-0.915)^2}{2*(0.00949)^2}}\right)$$

g/mil, and a haze in the range of 3 to 10 percent. The film has a thickness in the range of 10 to 75 μm. The method of making the polyethylene film according to instant invention includes the following steps: (1) providing at least one heterogeneously branched ethylene/α-olefin copolymer having a density in the range of about 0.910 to about 0.930 g/cm³, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8; (2) processing the heterogeneously branched ethylene/α-olefin copolymer via blown film extrusion process or cast film extrusion process; and (3) thereby forming a film having a thickness in the range of 10 to 75 μm, a normalized dart impact strength of equal or greater than (6666-7012*density) g/mil, a normalized tear strength of equal or greater than $$\left(440 * e^{\frac{-(density-0.915)^2}{2*(0.00949)^2}}\right)$$

g/mil, and a haze in the range of 3 to 10 percent.

The term "heterogeneously branched ethylene/α-olefin copolymer," as used herein, refers to a linear low density polyethylene prepared via a multi-constituent catalyst system, described in further details hereinbelow, in a single reactor.

The term "molecular weight distribution," as used herein, refers to the ratio of weight average molecular weight ($M_w$) to number average molecular weight ($M_n$), i.e. ($M_w/M_n$), described in further details herein below.

The term (co)polymerization, as used herein, refers to polymerization of ethylene in the presence of a comonomer.

The heterogeneously branched ethylene/α-olefin copolymer may, for example, have a density in the range of about 0.910 to about 0.940 g/cm$^3$. All individual values and subranges from about 0.910 to about 0.940 g/cm$^3$ are included herein and disclosed herein; for example, the heterogeneously branched ethylene/α-olefin copolymer may have a density in the range of 0.910 to 0.935 g/cm$^3$, or in the alternative, the heterogeneously branched ethylene/α-olefin copolymer may have a density in the range of 0.910 to 0.930 g/cm$^3$. The heterogeneously branched ethylene/α-olefin copolymer may, for example, have a molecular weight distribution in the range of about 2.8 to 3.8. All individual values and subranges from about 2.8 to 3.8 are included herein and disclosed herein; for example, the heterogeneously branched ethylene/α-olefin copolymer may have a molecular weight distribution in the range of 2.8 to 3.7; or in the alternative, the heterogeneously branched ethylene/α-olefin copolymer may have a molecular weight distribution in the range of 2.8 to 3.6; or in the alternative, the heterogeneously branched ethylene/α-olefin copolymer may have a molecular weight distribution in the range of about 2.9 to about 3.5. The heterogeneously branched ethylene/α-olefin copolymer may, for example, have a melt index ($I_2$) in the range of about 0.3 to about 4 dg/minutes. All individual values and subranges from about 0.3 to about 4 dg/minutes are included herein and disclosed herein; for example, the heterogeneously branched ethylene/α-olefin copolymer may have a melt index ($I_2$) in the range of about 0.3 to about 2 dg/minutes, or in the alternative, the heterogeneously branched ethylene/α-olefin copolymer may have a melt index ($I_2$) in the range of about 0.3 to about 1.5 dg/minutes, or in the alternative, the heterogeneously branched ethylene/α-olefin copolymer may have a melt index ($I_2$) in the range of about 0.3 to about 1.2 dg/minutes. The heterogeneously branched ethylene/α-olefin copolymer may, for example, have an $I_{10}/I_2$ ratio in the range of about 6.5 to about 7.7. All individual values and subranges from about 6.5 to about 7.7 are included herein and disclosed herein; for example, the heterogeneously branched ethylene/α-olefin copolymer may have an $I_{10}/I_2$ ratio in the range of about 6.5 to about 7.5, or in the alternative, the heterogeneously branched ethylene/α-olefin copolymer may have an $I_{10}/I_2$ ratio in the range of about 6.5 to about 7.4. The heterogeneously branched ethylene/α-olefin copolymer may, for example, have a high density fraction of equal or greater than about 10 percent. All individual values and subranges of equal or greater than about 10 percent are included herein and disclosed herein; for example, the heterogeneously branched ethylene/α-olefin copolymer may have a high density fraction of equal or greater than about 12 percent, or in the alternative, the heterogeneously branched ethylene/α-olefin copolymer may have a high density fraction of equal or greater than about 15 percent.

The heterogeneously branched ethylene/α-olefin copolymer, as described herein, is essentially free of any long chain branching; or in the alternative, the heterogeneously branched ethylene/α-olefin copolymer, as described herein, is free of any long chain branching. The heterogeneously branched ethylene/α-olefin copolymer may, for example, have a solubility distribution breadth index in the range of about 10 to about 25° C. All individual values and subranges from about 10 to about 25° C. are included herein and disclosed herein; for example, the heterogeneously branched ethylene/α-olefin copolymer may have a solubility distribution breadth index in the range of about 15 to about 25° C., or in the alternative, the heterogeneously branched ethylene/α-olefin copolymer may have a solubility distribution breadth index in the range of about 17 to about 25° C.

The heterogeneously branched ethylene/α-olefin copolymer may include any amount of one or more α-olefin copolymers; for example, the heterogeneously branched ethylene/α-olefin copolymer may comprise about less than 15 percent by weight of one or more α-olefin comonomers, based on the total weight of the heterogeneously branched ethylene/α-olefin copolymer. All individual values and subranges less than 15 weight percent are included herein and disclosed herein; for example, the heterogeneously branched ethylene/α-olefin copolymer may comprise about less than 10 percent by weight of one or more α-olefin comonomers, based on the total weight of the heterogeneously branched ethylene/α-olefin copolymer; or in the alternative, the heterogeneously branched ethylene/α-olefin copolymer may comprise about less than 8 percent by weight of one or more α-olefin comonomers, based on the total weight of the heterogeneously branched ethylene/α-olefin copolymer; or in the alternative, the heterogeneously branched ethylene/α-olefin copolymer may comprise about less than 5 percent by weight of one or more α-olefin comonomers, based on the total weight of the heterogeneously branched ethylene/α-olefin copolymer. The heterogeneously branched ethylene/α-olefin copolymer may include any amount of ethylene; for example, the heterogeneously branched ethylene/α-olefin copolymer may comprise at least about 85 percent by weight of ethylene, based on the total weight of the heterogeneously branched ethylene/α-olefin copolymer. All individual values and subranges above 85 weight percent are included herein and disclosed herein; for example, the heterogeneously branched ethylene/α-olefin copolymer may comprise at least about 90 percent by weight of ethylene, based on the total weight of the heterogeneously branched ethylene/α-olefin copolymer; or in the alternative, the heterogeneously branched ethylene/α-olefin copolymer may comprise at least about 92 percent by weight of ethylene, based on the total weight of the heterogeneously branched ethylene/α-olefin copolymer; or in the alternative, the heterogeneously branched ethylene/α-olefin copolymer may comprise at least about 95 percent by weight of ethylene, based on the total weight of the heterogeneously branched ethylene/α-olefin copolymer.

The α-olefin comonomers typically have no more than 20 carbon atoms. For example, the α-olefin comonomers may have 3 to 10 carbon atoms, or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The α-olefin comonomers may, for example, be selected from the group consisting of propylene, 1-butene, 1-hexene, and 1-octene, or in the alternative, the α-olefin comonomers may, for example, be selected from the group consisting of 1-hexene and 1-octene.

The heterogeneously branched ethylene/α-olefin copolymer may further be blended with other additives. Such additives include, but are not limited to, antistatic agents, color enhancers, dyes, lubricants, fillers, pigments, antioxidants, processing aids, stabilizers, neutralizers, blends thereof, and combinations thereof. Exemplary antioxidants include, but are not limited to, 3,5-di-tert-butyl-4-hydroxy hydrocinnamate, commercially available from Ciba Specialty Chemicals Company, under the trade name Irganox® 1010; tris (2,4 di-tert-butylphenyl) phosphite, commercially available from Ciba Specialty Chemicals Company, under the trade name Irgafos® 168; and 3-(3',5'-di-tert-butyl-4'-hydroxyphenyl) propionic acid, commercially available from Ciba Specialty Chemicals Company, under the trade name Irganox® 1076. Exemplary neutralizers include, but are not limited to, calcium stearate. The blend may contain any amounts of such additives. The blend may comprise about less than 10 percent by the weight of one or more such additives, based on the weight of the blend. All individual values and subranges from less than about 10 weight percent are included herein and disclosed herein; for example, the blend may comprise from less than 8 percent by the weight of one or more such additives, based on the weight of the blend; or in the alternative, the blend may comprise from less than 5 percent by the weight of one or more such additives, based on the weight of the blend; or in the alternative, the blend may comprise from less than 1 percent by the weight of one or more such additives, based on the weight of the blend.

The heterogeneously branched ethylene/α-olefin copolymer may further be blended with other polymers. Such other polymers are generally known to a person of ordinary skill in the art. Blends comprising the heterogeneously branched ethylene/α-olefin copolymer may be formed via any conventional methods. For example, the selected polymers may be melt blended via a single or twin screw extruder, or a mixer, e.g. a Banbury mixer, a Haake mixer, a Barbender internal mixer.

In general, blends containing the heterogeneously branched ethylene/α-olefin copolymer may comprise at least 40 percent by weight of the heterogeneously branched ethylene/α-olefin copolymer, based on the total weight of the blend. All individual values and subranges in the range of at least 40 weight percent are included herein and disclosed herein; for example, the blend may comprise at least 50 percent by weight of the heterogeneously branched ethylene/α-olefin copolymer, based on the total weight of the blend; or in the alternative, the blend may comprise at least 60 percent by weight of the heterogeneously branched ethylene/α-olefin copolymer, based on the total weight of the blend; or in the alternative, the blend may comprise at least 70 percent by weight of the heterogeneously branched ethylene/α-olefin copolymer, based on the total weight of the blend; or in the alternative, the blend may comprise at least 80 percent by weight of the heterogeneously branched ethylene/α-olefin copolymer, based on the total weight of the blend; or in the alternative, the blend may comprise at least 90 percent by weight of the heterogeneously branched ethylene/α-olefin copolymer, based on the total weight of the blend; or in the alternative, the blend may comprise at least 95 percent by weight of the heterogeneously branched ethylene/α-olefin copolymer, based on the total weight of the blend.

Different (co)polymerization reaction methods may be employed to produce the heterogeneously branched ethylene/α-olefin copolymer. Any conventional ethylene (co)polymerization reaction method may be employed to produce the heterogeneously branched ethylene/α-olefin copolymer. Such conventional ethylene (co)polymerization reaction methods include, but are not limited to, solution phase (co)polymerization method, gas phase (co)polymerization method, or slurry phase (co)polymerization method employing conventional reactors, e.g. loop reactor, sphere reactor, gas reactor, stirred tank reactor, or batch reactor. In one embodiment, the heterogeneously branched ethylene/α-olefin copolymer is produced via solution phase (co)polymerization method employing a single loop reactor or a single sphere reactor.

The heterogeneously branched ethylene/α-olefin copolymer may be prepared via a multi-constituent catalyst system, as described hereinbelow in further details, suitable for (co)polymerizing ethylene and one or more α-olefin comonomer in a single loop or sphere reactor operating under a solution condition.

In a solution phase (co)polymerization method employing a loop reactor, the (co)polymerization takes place in a paraffinic solvent at relatively low pressures. The ethylene monomers and one or more α-olefin comonomers are combined with a solvent, e.g. Isopar® E. The feed streams are purified from polar impurities such as water, carbon monoxide, sulfurous compounds, and unsaturated compounds such as acetylene before entering the reactor. The feed stream may enter the loop reactor from the bottom, the top, or both the bottom and the top. The mixing occurs via circulation of the feed streams through the loops of the reactor. A multi-constituent catalyst system, as described hereinbelow in further details, facilitates the (co)polymerization of the heterogeneously branched ethylene/α-olefin copolymer. The constituents of the multi-constituent catalyst system may be combined before entering the reactor; thus, forming the multi-constituent catalyst system before entering the loop reactor; or in the alternative, the individual constituents of the multi-constituent catalyst system may be fed into the reactor individually; thus, forming the multi-constituent catalyst system in the loop reactor. The reactor pressure ranges from about 300 to about 1000 psi. All individual values and subranges from about 300 to about 1000 psi are included herein and disclosed herein; for example, the pressure range may be from about 300 to about 750. The reactor temperature ranges from about 165 to about 250° C. All individual values and subranges from about 165 to about 250° C. are included herein and disclosed herein; for example, the temperature range may be from about 165 to about 220° C. The overall ethylene conversion is in the range of about 80 to about 98 percent. After the molten polymer exits the loop reactor, the molten polymer is conveyed to a first devolatilizer where the majority of the solvent, and the unconverted ethylene monomers and one or more α-olefin comonomers are removed from the polymer solution, and then recycled. The polymer solution may then be conveyed via a pre-heater to a vacuum devolatilizer where the remaining residual solvent is removed. The recycled stream is then purified before entering the reactor again. The polymer melt is conveyed to an extruder, and additives and/or stabilizers may be added and blended into the polymer melt. The polymer is pelletized. The pellets are transferred to pellet stripping vessels where the last traces of the solvent are removed. The finished pellets of the heterogeneously branched ethylene/α-olefin copolymers are then transferred to blending or storage bins.

The heterogeneously branched ethylene/α-olefin copolymer may be formed into the inventive polyethylene films. The inventive polyethylene film may have any optical properties, i.e. gloss or haze. For example, the inventive polyethylene film may have a gloss in the range of about 50 to about 85. All individual values and subranges from about 50 to about 85 are included herein and disclosed herein; for example, the inventive polyethylene film may have a gloss in the range of about 60 to about 85; or in the alternative, the inventive polyethylene film may have a gloss in the range of about 65 to about 85. The inventive polyethylene film of the instant invention may further have a haze in the range of about 3 to about 15 percent. All individual values and subranges from about 3 to about 15 percent are included herein and disclosed herein; for example, the inventive polyethylene film may have a haze in the range of about 3 to about 10 percent; or in the alternative, the inventive polyethylene film may have a haze in the range of about 3 to about 8 percent; or in the alternative, the inventive polyethylene film may have a haze in the range of about 3 to about 6 percent. The inventive polyethylene film may, for example, have a normalized drop dart impact strength of at least 75 g/mil. All individual values and subranges of at least 75 g/mil are included herein and discloses herein; for example, the inventive polyethylene film may have a normalized drop dart impact strength of at least 145 g/mil; or in the alternative, the inventive polyethylene film may have a normalized drop dart impact strength of at least 215 g/mil; or in the alternative, the inventive polyethylene film may have a normalized drop dart impact strength of at least 285 g/mil. In the alternative, the inventive polyethylene film may, for example, have a normalized drop dart impact strength of at least 99 g/mil. All individual values and subranges of at least 99 g/mil are included herein and discloses herein; for example, the inventive polyethylene film may have a normalized drop dart impact strength of at least 169 g/mil; or in the alternative, the inventive polyethylene film may have a normalized drop dart impact strength of at least 239 g/mil; or in the alternative, the inventive polyethylene film may have a normalized drop dart impact strength of at least 309 g/mil. In another alternative, the inventive polyethylene may have a normalized dart impact strength A equal or greater than (6666-7012*density) g/mil, wherein the density is the density of the heterogeneously branched ethylene/α-olefin copolymer. In another alternative, the inventive polyethylene may have a normalized dart impact strength A equal or greater than (6690-7012*density) g/mil, wherein the density is the density of the heterogeneously branched ethylene/α-olefin copolymer. The inventive polyethylene film may, for example, have a puncture strength in the range of about 150 to about 400 ft-lb/inch³. All individual values and subranges from about 150 to about 400 ft-lb/inch³ are included herein and discloses herein; for example, the inventive polyethylene film may have a puncture strength in the range of about 150 to about 350 ft ft-lb/inch³; or in the alternative, the inventive polyethylene film may have a puncture strength in the range of about 150 to about 300 ft ft-lb/inch³. The inventive polyethylene film may, for example, have a normalized Elmendorf tear resistance in the machine direction of at least 14 g/mil. All individual values and subranges of at least 14 g/mil are included herein and discloses herein; for example, the inventive polyethylene film may have a normalized Elmendorf tear resistance in the machine direction of at least 126 g/mil; or in the alternative, the inventive polyethylene film may have a normalized Elmendorf tear resistance in the machine direction of at least 383 g/mil; or in the alternative, the inventive polyethylene film may have a normalized Elmendorf tear resistance in the machine direction of at least 385 g/mil. In the alternative, the inventive polyethylene film may, for example, have a normalized Elmendorf tear resistance in the machine direction of at least 15 g/mil. All individual values and subranges of at least 15 g/mil are included herein and disclosed herein; for example, the inventive polyethylene film may have a normalized Elmendorf tear resistance in the machine direction of at least 135 g/mil; or in the alternative, the inventive polyethylene film may have a normalized Elmendorf tear resistance in the machine direction of at least 409 g/mil; or in the alternative, the inventive polyethylene film may have a normalized Elmendorf tear resistance in the machine direction of at least 420 g/mil. In another alternative, the inventive polyethylene film may, for example, have a normalized Elmendorf tear resistance in the machine direction of equal or greater than $$\left(440 * e^{\frac{-(density-0.915)^2}{2*(0.00949)^2}}\right)$$

g/mil, wherein the density is the density of the heterogeneously branched ethylene/α-olefin copolymer. In another alternative, the inventive polyethylene film may, for example, have a normalized Elmendorf tear resistance in the machine direction of equal or greater than $$\left(470 * e^{\frac{-(density-0.915)^2}{2*(0.00949)^2}}\right)$$

g/mil, wherein the density is the density of the heterogeneously branched ethylene/α-olefin copolymer. The inventive polyethylene film may, for example, have a thickness in the range of about 10 to about 250 µm. All individual values and subranges from about 10 to about 250 µm are included herein and discloses herein; for example, the inventive polyethylene film may have a thickness in the range of about 10 to about 150 µm; or in the alternative, the inventive polyethylene film may have a thickness in the range of about 10 to about 75 µm.

Different methods may be employed to form the inventive film; for example, the inventive film may be formed via blown film extrusion process, cast film extrusion process, calendering, or coextrusion.

In blown film extrusion process, a heterogeneously branched ethylene/α-olefin copolymer is provided. The heterogeneously branched ethylene/α-olefin copolymer has a density in the range of about 0.910 to 0.930 g/cm³, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8. The heterogeneously branched ethylene/α-olefin copolymer is melt extruded through an annular circular die thereby forming a tube. The tube is expanded by air, for example two or three times its diameter, and at the same time, the cooled air chills the web to a solid state. The degree of blowing or stretch determines the balance and level of tensile and impact properties. An internal air cooling ring may be used as well, in order to increase throughput rates and optical quality. Rapid cooling is essential to achieve the crystalline structure necessary to give clear, glossy films. The film tube is then collapsed within a V-shaped frame of rollers and is nipped at the end of the frame to trap the air within the bubble. The nip rolls also draw the film away from the die. The draw rate is controlled to balance the physical properties with the transverse properties achieved by the blow draw ratio. The tube may be wound as such or may be slit and wound as a single-film layer onto one or more rolls. The tube may also be directly processed into bags.

In an alternative, i.e. blown film extrusion process, a heterogeneously branched ethylene/α-olefin copolymer is provided. The heterogeneously branched ethylene/α-olefin copolymer has a density in the range of about 0.910 to about 0.930 g/cm³, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8. The heterogeneously branched ethylene/α-olefin copolymer is then uniformly blended with other polymers or additives, as described hereinabove, in a high intensity mixer. The blend is melt extruded through an annular circular die thereby forming a tube. The tube is expanded by air, for example two or three times its diameter, and at the same time, the cooled air chills the web to a solid state. The degree of blowing or stretch determines the balance and level of tensile and impact properties. An internal air cooling ring may be used as well, in order to increase throughput rates and optical quality. Rapid cooling is essential to achieve the crystalline structure necessary to give clear, glossy films. The film tube is then collapsed within a V-shaped frame of rollers and is nipped at the end of the frame to trap the air within the bubble. The nip rolls also draw the film away from the die. The draw rate is controlled to balance the physical properties with the transverse properties achieved by the blow draw ratio. The tube may be wound as such or may be slit and wound as a single-film layer onto one or more rolls. The tube may also be directly processed into bags.

In another alternative, i.e. cast extrusion process, a heterogeneously branched ethylene/α-olefin copolymer is provided. The heterogeneously branched ethylene/α-olefin copolymer has a density in the range of about 0.910 to about 0.930 g/cm$^3$, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8. The heterogeneously branched ethylene/α-olefin copolymer is melt extruded through a slot die thereby forming a thin flat profile, i.e. a hot web, which is then quenched immediately to a solid state by contacting the hot web very quickly on a chilled roll or drum. A liquid quenching bath maybe used in place of or contiguous to the chill roll. The web maybe drawn down in thickness by overdriving the quenching roll relative to the extrusion velocity. In chill roll quenching, it may be necessary to pin the hot web to the drum to eliminate air pockets, surface ripples, and other defects. Air knife in close proximity to the emerging melt, or electrostatic pinning, where a high voltage field is established may be employed to force the web to the drum. Vacuum assist under the web or hooded quench rolls may be used to control the atmosphere near the die and quench roll(s). Thicker webs or higher line speeds may demand the use of multiple cooling rolls. The quenched film may be further processed; for example, the quenched film may be uniaxially drawn, biaxially drawn, coated, or corona-discharge-treated to enhance adhesion. Generally, the film is fed directly in-line to these other processes. The uneven edges may be trimmed off and the film may then be wound into master rolls for subsequent slitting into narrower rolls, or it may be wound directly for shipment to customers.

In another alternative, i.e. cast extrusion process, a heterogeneously branched ethylene/α-olefin copolymer is provided. The heterogeneously branched ethylene/α-olefin copolymer has a density in the range of about 0.910 to about 0.930 g/cm$^3$, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8. The heterogeneously branched ethylene/α-olefin copolymer is then uniformly blended with other polymers or additives, as described hereinabove, in a high intensity mixer. The blend is extruded through a slot die thereby forming a thin flat profile, i.e. a hot web, which is then quenched immediately to a solid state by contacting the hot web very quickly on a chilled roll or drum. A liquid quenching bath maybe used in place of or contiguous to the chill roll. The web maybe drawn down in thickness by overdriving the quenching roll relative to the extrusion velocity. In chill roll quenching, it may be necessary to pin the hot web to the drum to eliminate air pockets, surface ripples, and other defects. Air knife in close proximity to the emerging melt, or electrostatic pinning, where a high voltage field is established may be employed to force the web to the drum. Vacuum assist under the web or hooded quench rolls may be used to control the atmosphere near the die and quench roll(s). Thicker webs or higher line speeds may demand the use of multiple cooling rolls. The quenched film may be further processed; for example, the quenched film may be uniaxially drawn, biaxially drawn, coated, or corona-discharge-treated to enhance adhesion. Generally, the film is fed directly in-line to these other processes. The uneven edges may be trimmed off and the film may then be wound into master rolls for subsequent slitting into narrower rolls, or it may be wound directly for shipment to customers.

In another alternative, i.e. coextrusion process, multiple layers of polymers, wherein at least one layer being a heterogeneously branched ethylene/α-olefin copolymer having a density in the range of about 0.910 to about 0.930 g/cm$^3$, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8, are combined to form a multilayer film. A combining block may be employed to combine the multiple layers of polymers. Parallel openings within the combining block are fed from two or more extruders, one for each polymer. The polymer melts are forced to flow in laminar fashion through the die, and onto the quench drum. The film is processed conventionally or may then be oriented. The polymer melts are forced to flow in laminar fashion through the die, and onto the quench drum. The film may then be processed conventionally, or it may then be oriented. The most common types of coextrusion are AB, ABA, or ABC where A is one polymer system, B is another (of the same polymer type or different), and C is a third polymer type. Where two polymers may not adhere sufficiently, it is possible to extrude a tie or adhesive layer in the coextrusion. Ionomer resins are often used as such tie layers. The inner core may be a foamed resin with surface layers of superior finish resins. Coextruded films often eliminate the need for costly lamination processes.

In another alternative, i.e. coextrusion process, multiple layers of polymers, wherein at least one layer being a polymer blend including at least one heterogeneously branched ethylene/α-olefin copolymer having a density in the range of about 0.910 to about 0.930 g/cm$^3$, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8, combined to form a multilayer film. A combining block may be employed to combine the multiple layers of polymers. Parallel openings within the combining block are fed from two or more extruders, one for each polymer. The polymer melts are forced to flow in laminar fashion through the die, and onto the quench drum. The film may then be processed conventionally, or it may then be oriented. The most common types of coextrusion are AB, ABA, or ABC where A is one polymer system, B is another (of the same polymer type or different), and C is a third polymer type. Where two polymers may not adhere sufficiently, it is possible to extrude a tie or adhesive layer in the coextrusion. Ionomer resins are often used as such tie layers. The inner core may be a foamed resin with surface layers of superior finish resins. Coextruded films often eliminate the need for costly lamination processes.

In another alternative, i.e. coextrusion process, multiple layers of polymers, wherein at least one layer being a heterogeneously branched ethylene/α-olefin copolymer having a density in the range of about 0.910 to about 0.930 g/cm$^3$, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8, are combined to form a multilayer film. A multimanifold die may be employed to bring the melt streams together within the die thereby combining the multiple layers of polymers. Multimanifold dies may be flat or tubular. The polymer melts are extruded through the multimanifold die, and onto the quench drum. The film may then be processed conventionally, or it may then be oriented. The most common types of coextrusion are AB, ABA, or ABC where A is one polymer system, B is another (of the same polymer type or different), and C is a third polymer type. Where two polymers may not adhere sufficiently, it is possible to extrude a tie or adhesive layer in the coextrusion. Ionomer resins are often used as such tie layers. The inner core may be a foamed resin with surface layers of superior finish resins. Coextruded films often eliminate the need for costly lamination processes.

In another alternative, i.e. coextrusion process, multiple layers of polymers, wherein at least one layer being a polymer blend including at least one heterogeneously branched ethylene/α-olefin copolymer having a density in the range of about 0.910 to about 0.930 g/cm³, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8, are combined to form a multilayer film. A multimanifold die may be employed to bring the melt streams together within the die thereby combining the multiple layers of polymers. Multimanifold dies may be flat or tubular. The polymer melts are extruded through the multimanifold die, and onto the quench drum. The film may then be processed conventionally, or it may then be oriented. The most common types of coextrusion are AB, ABA, or ABC where A is one polymer system, B is another (of the same polymer type or different), and C is a third polymer type. Where two polymers may not adhere sufficiently, it is possible to extrude a tie or adhesive layer in the coextrusion. Ionomer resins are often used as such tie layers. The inner core may be a foamed resin with surface layers of superior finish resins. Coextruded films often eliminate the need for costly lamination processes.

In another alternative, i.e. calendering process, a heterogeneously branched ethylene/α-olefin copolymer is provided. The heterogeneously branched ethylene/α-olefin copolymer has a density in the range of about 0.910 to about 0.930 g/cm³, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8. The heterogeneously branched ethylene/α-olefin copolymer is heated on hot rolls and squeezed between two or more parallel rolls into a thin web or sheet. In the alternative, the heterogeneously branched ethylene/α-olefin copolymer may be blended with other polymers or additives and then fed to a rolling nip between hot, temperature-controlled rolls. The polymer mass is worked further in the nip and flows out to a uniform sheet as it passes through the nip. The web is nipped again and drawn down to a thinner sheet or film, and may undergo a third such step. Draw may be imparted to the web by a slight overdrive between nips. Since the surface of the film tends to take on the nature of the hot nip rolls, special surfaces such as high polish, matte, or embossing may be achieved by changing the rolls in the calender.

General Description of the Multi-Constituent Catalyst System

The multi-constituent catalyst system, as used herein, refers to a Ziegler-Natta catalyst composition including a magnesium and titanium containing procatalyst and a cocatalyst. The cocatalyst comprises a compound selected from the group consisting of (t-butyldimethylsiloxy)di(i-butyl)aluminum, (t-butyldimethylsiloxy)di(n-octyl)aluminum, pentafluorophenoxydi(isobutyl)aluminum, pentafluorophenoxydi(n-octyl)aluminum, phenoxydi(i-butyl)aluminum, (3,5-dimethyl-2,4-pyrazol-1-yl)di(ethyl)aluminum, (3,5-dimethyl-2,4-pyrazol-1-yl)di(n-octyl)aluminum, and dodecyloxydi(n-octyl)aluminum or the mixture formed by reaction of approximately equal molar quantities of t-butyldi(methyl)hydroxysilane with tri(isobutyl)aluminum or tri(n-octyl)aluminum, pentafluorophenol with tri(isobutyl)aluminum or tri(n-octyl)aluminum, phenol with tri(isobutyl)aluminum, 3,5-dimethyl-1,4-pyrazole with triethylalumium or tri(n-octyl)alumium, or dodecanol with tri(n-octyl)aluminum. The procatalyst may, for example, comprise the reaction product of magnesium dichloride, an alkylaluminum dihalide, and a titanium alkoxide.

The olefin polymerization procatalyst precursors comprise the product which results from combining:

(A) a magnesium halide prepared by contacting:
(1) at least one hydrocarbon soluble magnesium component represented by the general formula $R_2Mg \cdot xAlR'_3$ wherein each R is independently a hydrocarbyl or a hydrocarbyloxy group having from 1 to about 20, preferably from 1 to about 10 carbon atoms, each R' is independently a halide, a hydrocarbyl or hydrocarbyloxy group having from 1 to about 20, preferably from 1 to about 10 carbon atoms,

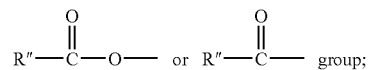

R" is a hydrocarbyl or a hydrocarbyloxy group having from 1 to about 20, preferably from 1 to about 10 carbon atoms; and x has a value such that the atomic ratio of Al:Mg is from about 0.025:1 to about 0.25:1, preferably from about 0.025:1 to about 0.125:1; and (2) at least one non-metallic or metallic halide source under conditions such that the reaction temperature does not exceed about 60° C., preferably does not exceed about 40° C., and most preferably does not exceed about 35° C.;

(B) at least one transition metal compound represented by the formula $Tm(OR)_yX_{y-x}$ wherein Tm is a metal of Groups IVB, VB, VIIB, VIIB or VIII of the Periodic Table; R is a hydrocarbyl group having from 1 to about 20, preferably from 1 to about 10 carbon atoms or a

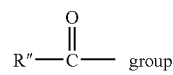

wherein R" is a hydrocarbyl or a hydrocarbyloxy group having from 1 to about 20, preferably from 1 to about 10 carbon atoms; x and y each independently have values from zero up to the valence of Tm and x+y has a value equal to the valence of Tm;

(C) an additional halide source if an insufficient quantity of component (A-2) is present to provide the desired excess X:Mg ratio;

(D) an organoaluminum compound, if components (A-1) and (C) are not present in quantities sufficient to provide the desired Al:Tm ratio; and wherein (1) the Mg:Tm atomic ratio is from about 2:1 to about 200:1, preferably from about 5:1 to about 70:1, most preferably from about 10:1 to about 50:1,
(2) the Al:Tm atomic ratio is from about 0.1:1 to about 200:1, preferably from about 1:1 to about 50:1, most preferably from about 3:1 to about 30:1; and
(3) excess X:Mg ratio is from about 0.001:1 to about 100:1, preferably from about 0.01:1 to about 50:1, most preferably from about 0.1:1 to about 5:1.

The term excess X is defined as that amount of halide above the amount necessary to convert the R groups attached to a magnesium atom in component (A) to a halide.

Suitable magnesium components which can be employed herein include, for example, those represented by the general formula $R_2Mg \cdot xAlR'_3$ wherein each R is independently a hydrocarbyl or hydrocarbyloxy group having from 1 to about 20, preferably from 1 to about 10 carbon atoms, each R' is independently a halide, a hydrocarbyl or hydrocarbyloxy group having from 1 to about 20, preferably from about 1 to about 10 carbon atoms,

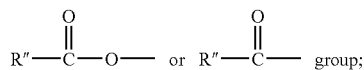

R" is a hydrocarbyl or a hydrocarbyloxy group having from 1 to about 20, preferably from 1 to about 10 carbon atoms; and x has a value such that the atomic ratio of Al:Mg of from about 0.025:1 to about 0.25:1, preferably from about 0.025:1 to about 0.125:1.

Particularly suitable organomagnesium compounds which can be employed to form such magnesium component include, for example, n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium, butyl-octyl magnesium and others wherein the alkyl has from 1 to 20 carbon atoms. Exemplary suitable magnesium diaryls include diphenylmagnesium, dibenzylmagnesium, and ditolylmagnesium. Suitable organomagnesium compounds also include magnesium alkoxides and aryloxides and aryl and alkyl magnesium halides with the halogen-free organomagnesium compounds being more desirable.

Suitable aluminum compounds which can be employed to prepare the magnesium component includes, for example, triethylaluminum, triisobutylaluminum, trimethylaluminum, tri-n-butylaluminum, diethylaluminum ethoxide, ethylaluminum sesquichloride, diethylaluminum chloride, diethylaluminum octoate, ethylaluminum chloride octoate, ethylaluminum ethoxide chloride, mixtures thereof and the like.

The magnesium components are formed immediately upon admixing an organomagnesium compound and an aluminum compound, preferably in a hydrocarbon medium.

Among the halide sources which can be employed herein are the active non-metallic halides and metallic halides.

Suitable non-metallic halides are represented by the formula R'X wherein R' is hydrogen or an active monovalent organic radical and X is a halogen. Particularly suitable non-metallic halides include, for example, hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, a-phenylethyl bromide, diphenyl methyl chloride and the like. Most preferred are hydrogen chloride, t-butyl chloride, allyl chloride and benzyl chloride.

Suitable metallic halides which can be employed herein include those represented by the formula $MR_{y-a}X_a$ wherein M is a metal of Groups IIB, IIIA or IVA, of Mendeleev's Periodic Table of Elements, R is a monovalent organic radical, X is a halogen, y has a value corresponding to the valence of M and a has a value from 1 to y. Preferred metallic halides are aluminum halides of the formula $AlR_{3-a}X_a$ wherein each R is independently a hydrocarbyl group as hereinbefore defined such as alkyl; X is a halogen and a is a number from 1 to 3. Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as stannic chloride, aluminum trichloride or a combination of aluminum trichloride with an alkyl aluminum halide or a trialkyl aluminum compound may be suitable employed.

Suitable transition metal compounds which can be employed herein include, for example, those represented by the general formulas $Tm(OR)_y(X)_x$ or $Tm(OR)_{x-2}O$ wherein Tm is a transition metal of Groups IVB, VB, VIIB, VIIB or VIII of the Periodic Table of the Elements as published by the Sargent-Welch Scientific Company as catalog number S-18806; each R is hydrocarbyl or

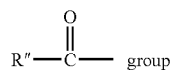

as previously described; R" is a hydrocarbyl or a hydrocarbyloxy group having from 1 to about 20, preferably from 1 to about 10 carbon atoms; X is a halogen, preferably chlorine or bromine; x has a value from zero to a value equal to the valence of Tm; y has a value from zero to a value equal to the valence of Tm and the sum of x+y is equal to the valence of Tm. Particularly suitable transition metal compounds include, for example, titanium tetrachloride, titanium trichloride, vanadium tetrachloride, zirconium tetrachloride, tetra (isopropoxy)-titanium, tetrabutoxytitanium, diethoxytitanium dibromide, dibutoxytitanium dichloride, tetraphenoxytitanium, tri-isopropoxy vanadium oxide, zirconium tetra-n-propoxide, mixtures thereof and the like.

Other suitable titanium compounds which can be employed as the transition metal component herein include those titanium complexes and/or compounds resulting from reacting:

(A) at least one titanium compound represented by the formula $Ti(OR)_xX_{4-x}$ wherein each R is independently a hydrocarbyl group having from 1 to about 20, preferably from about 1 to about 10, most preferably from about 2 to about 4 carbon atoms; X is a halogen and x has a value from zero to 4; with (B) at least one compound containing at least one aromatic hydroxyl group.

The foregoing procatalyst components are combined in proportions sufficient to provide atomic ratios as previously mentioned.

Other components present in the polymerization zone should be essentially free of impurities which react with aluminum alkyls. Otherwise, additional quantities of an organometallic compound as previously described, preferably an organoaluminum compound, must be used to react with such impurities. Moreover, it is understood that in the catalyst the aluminum compound should be in the form of trialkyl aluminum or alkyl aluminum halide provided that the alkyl aluminum halide be substantially free of alkyl aluminum dihalide.

In the above mentioned aluminum compounds, the alkyl groups independently have from 1 to about 20, preferably from 1 to about 10 carbon atoms.

When additional quantities of aluminum compound are employed, it can be added to the aforementioned catalyst during the preparation thereof or the aluminum deficient catalyst can be mixed with the appropriate aluminum compound prior to entry into the polymerization reactor or, alternatively, the aluminum deficient catalyst and the aluminum compound can be added to the polymerization reactor as separate streams or additions.

The foregoing pro-catalytic reaction product is preferably prepared in the presence of an inert diluent. The concentrations of catalyst components are preferably such that when the essential components of the catalytic reaction product are combined, the resultant slurry is from about 0.005 to about 1.0 molar (moles/liter) with respect to magnesium. By way of an example of suitable inert organic diluents can be mentioned liquified ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° C. to about 200° C. Also included as suitable inert diluents are benzene, toluene, ethylbenzene, cumene, decalin and the like.

Mixing of the procatalyst components to provide the desired catalytic reaction product is advantageously prepared under an inert atmosphere such as nitrogen, argon or other inert gas at temperatures in the range from about −100° C. to about 200° C., preferably from about −20° C. to about 100° C., provided that the magnesium halide support is prepared such that the reaction temperature does not exceed about 60° C. In the preparation of the catalytic reaction product, it is not necessary to separate hydrocarbon soluble components from hydrocarbon insoluble components of the reaction product.

In order to maximize catalyst efficiency, the procatalyst is prepared by mixing the components of the procatalyst in an inert liquid diluent in the following especially preferred order: organomagnesium component, halide source, additional halide source, if required, the transition metal compound and additional aluminum compound, if required.

The procatalyst composition serves as one component of a Ziegler-Natta catalyst composition, in combination with a cocatalyst, and optionally one or more polymerization modifiers. The cocatalyst is preferably employed in a molar ratio based on titanium in the procatalyst of from 1:1 to 100:1, but more preferably in a molar ratio of from 2:1 to 50:1.

The olefin polymerization catalyst is produced by any suitable procedure of contacting the procatalyst, and cocatalyst. The catalyst components or combinations thereof can be pre-contacted prior to polymerization to form a pre-activated catalyst, or the components can be contacted simultaneously with contact with an olefin monomer in a suitable reactor. In one modification, the catalyst components simply are mixed in a suitable vessel and the preformed catalyst thereby produced is introduced into the polymerization reactor when initiation of polymerization is desired for purposes of catalyst screening. In an alternate modification, the catalyst components are separately introduced into the polymerization reactor, and the catalyst is formed in situ.

The cocatalyst compositions for use in the present invention in the most general sense comprise the reaction product of at least two reagents, especially one or more metal containing Lewis acids with one or more organic protonating reagents. It should be appreciated by one of skill in the art that the resulting product may contain a mixture of species, including equilibria between various species and dynamic, interconverting compounds. In one embodiment, the reaction mixture formed upon combining the foregoing reagents in a suitable diluent, preferably a hydrocarbon such as hexane or heptane is preferred for use, rather than the purified and/or isolated reaction product itself.

Suitable Lewis acids are compounds of the formula: $[M^4A^1_{x'}G_{y'}]_{z'}$, wherein:
$M^4$ is a metal of Groups 2-13, Ge, Sn, or Bi;
$A^1$ is independently an anionic or polyanionic ligand;
x' is a number greater than zero and less than or equal to 6;
G is a neutral Lewis base, optionally bound to $A^1$;
y' is a number from 0-4;
z' is a number from 1 to 10.

Preferably, the Lewis acids are metal compounds of the general formula: $M^4A^1_{x'}G_{y'}$, wherein $M^4$ is a metal of Groups 2-13, Ge, Sn, or Bi; $A^1$ is independently an anionic ligand; x' is an integer and is equal to the valence of $M^4$; G is a neutral Lewis base; and y' is a number from 0-4. More preferably, $M^4$ is Mg, B, Ga, Al, or Zn; $A^1$ is $C_{1-20}$ hydrocarbyl or inertly substituted hydrocarbyl, especially $C_{1-12}$ alkyl or aryl. Preferred inert substituents include halide, trimethylsilyl, haloaryl, and haloalkyl. Most highly preferably, $M^4$ is aluminum.

The protonating reagents used in the present invention to form cocatalysts include compounds of the formula: $[(H-J^1)_{z''}A^2]_{z'''}$, wherein:
$J^1$ is $NA^3$, $PA^3$, S, or O,
z'' is 1 or 2,
$A^2$ is $C_{1-20}$ hydrocarbyl or inertly substituted hydrocarbyl, tri($C_{1-10}$hydrocarbyl)silyl, or a polyvalent derivative thereof,
$A^3$ is hydrogen, $C_{1-20}$ hydrocarbyl or inertly substituted hydrocarbyl, or a covalent bond (when $A^2$ is a divalent ligand group and z'' is one); and
z''' is a number from 1 to 10.

Preferred protonating reagents include compounds of the formula: $(H-J^1)_{z''}A^2$, wherein $J^1$ is $NA^3$, $PA^3$, S, or O, and z'' is 1 or 2; and $A^2$ is $C_{1-20}$ hydrocarbyl or inertly substituted hydrocarbyl, tri($C_{1-4}$hydrocarbyl)silyl, or a divalent derivative thereof, especially $C_{1-12}$ alkyl, 1,4-butylene, tri($C_{1-4}$alkyl)silyl, or aryl, and $A^3$ is hydrogen, $C_{1-20}$ hydrocarbyl or inertly substituted hydrocarbyl, or a covalent bond. Preferred inert substituents are halide, trimethylsilyl, haloaryl, or haloalkyl.

Especially desired cocatalysts for use according to the present invention are the reaction products of tri($C_{1-20}$ alkyl) hydroxysilanes, fluorinated aromatic alcohols, or inertly substituted derivatives thereof, especially fluorinated phenols, with trihydrocarbylaluminum compounds, especially tri($C_{2-20}$ alkyl)aluminum compounds, most especially tri ($C_{4-8}$ n-alkyl)aluminum compounds. Highly desirably, the cocatalysts are the corresponding siloxydialkylaluminum derivatives, aryloxydialkylaluminum derivatives or mixtures thereof. The skilled artisan will appreciate that the actual reaction mixture comprises an equilibrium of possible products, of which the foregoing comprise one component.

A Specific Description of the Multi-Constituent Catalyst System

An exemplary multi-constituent catalyst system includes a Ziegler-Natta catalyst composition including a magnesium and titanium containing procatalyst and a cocatalyst. The procatalyst is a titanium supported $MgCl_2$ Ziegler Natta catalyst characterized by a Mg:Ti molar ratio of 40:1.5. The cocatalyst is a modified alkyl aluminum compound. The cocatalyst is prepared by reacting 3,5-dimethylpyrazole (DMP) with tri-n-octylaluminum in a hydrocarbon solvent, resulting in 3,5-dimethylpyrazoldi-n-octylaluminium, where the DMP:Al molar ratio is about 0.95:1. The procatalyst may have a Ti:Mg ratio between 1.0:40 to 3.0:40, preferably 1.5:40. The procatalyst and the cocatalyst components can be contacted either before entering the reactor or in the reactor. The procatalyst may, for example, be any other titanium based Ziegler Natta catalyst. The Al:Ti molar ratio of procatalyst component to cocatalyst component may be from about 2 to about 50; in the alternative, it may be from about 6 to about 18. The tri alkyl aluminum cocatalyst may be modified by other mono-substituted pyrazoles, di-substituted pyrazoles, tri-substituted pyrazoles, mono-substituted triazoles, di-substituted triazoles, tri-substituted triazoles, t-butyldimethylsilanol, or other silanols. The alkyl group on the aluminum may be $C_2$-$C_{18}$.

The procatalyst may have a Ti:Mg ratio between 1.0:40 to 3.0:40, preferably 1.5:40. The procatalyst and the cocatalyst components can be contacted either before entering the reactor or in the reactor. The Al:Ti molar ratio of procatalyst component to cocatalyst component may be from about 2 to about 50; in the alternative, it may be from about 6 to about 18.

EXAMPLES

It is understood that the present invention is operable in the absence of any component which has not been specifically disclosed. The following examples are provided in order to further illustrate the invention and are not to be construed as limiting.

Multi-Constituent Catalyst

An exemplary multi-constituent catalyst system was prepared according to the following procedure. A solution containing about 24 percent by weight of tri-n-octylaluminum heptane was added to a slurry of solid 3,5-DMP-H (3,5-dimethylpyrazole) in Isopar® E. The addition of the solution containing about 24 percent by weight of tri-n-octylaluminum heptane was controlled such that the temperature of the reactants remained below 40° C. As the addition of the solution proceeded, the solid ligands were slowly dissolved. The solution was stirred for about two hours, thereby generating 7.7 kg of a 0.3 M (1.15 weight percent Al, 11508 ppm Al) of the multi-constituent catalyst system, as shown in below.

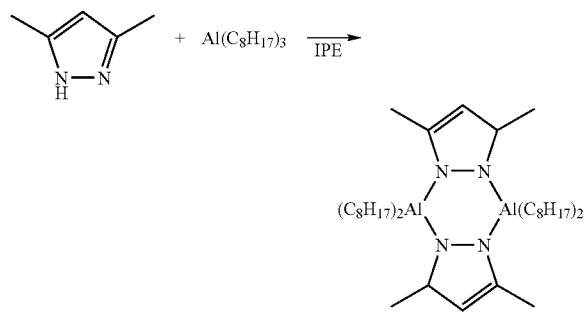

Inventive Example 1

Inventive Examples 1 and 2 were made according to the following procedures: Heterogeneously branched ethylene/α-olefin copolymers were prepared using a multi-constituent catalyst system, as described hereinabove, suitable for (co)polymerizing ethylene and one or more α-olefin comonomers, e.g. 1-octene, in a single loop reactor operating under a solution condition. The ethylene monomers and 1-octene comonomers were combined with a solvent, e.g. Isopar® E, commercially available from ExxonMobil. The feed streams were purified from polar impurities such as water, carbon monoxide, sulfurous compounds, and unsaturated compounds such as acetylene before entering the reactor. The reactor was a 42.5 gallon steam traced loop-type reactor. The mixing was achieved via circulating the polymer/catalyst solution through the loops. The feed entered the reactor both from the bottom and the top. The reactor temperature was about 195° C., and the reactor pressure was about 725 psi. After the polymer solution left the reactor, the solvent with unconverted ethylene monomers and 1-octene comonomers was removed from the polymer solution via a two stage devolatilizer system, and then recycled. The recycled stream was purified before entering the reactor again. The polymer melt was fed to an extruder, and the polymer was pelletized. The pellets were transferred to pellet stripping vessels where the last traces of the solvent were removed. The finished pellets were then transferred to storage bins. The average catalyst residence time was about 7.5 minutes. The properties of the heterogeneously branched ethylene/α-olefin copolymers are listed in Table I.

The inventive heterogeneously branched ethylene/α-olefin copolymers were further processed via blown film extrusion process on Gloucester line with a 6-inch diameter Sano die. The die had a gap of 70 mils. The film was blown with a blow up ratio of about 2.5 and a frost-line height of about 30 inches. The layflat width of the film was about 23.5 inches, while the thickness of the films was about 2 mils. The blown film extrusion process conditions are further listed in Table II. The heterogeneously branched ethylene/α-olefin copolymer was melt extruded through an annular circular die. The hot melt emerged from the die thereby forming a tube. The tube was expanded by air, and at the same time, the cooled air chilled the web to a solid state. The film tube was then collapsed within a V-shaped frame of rollers and was nipped at the end of the frame to trap the air within the bubble. The nip rolls also drew the film away from the die. The tube was slit and wound as a single-film layer onto a roll. The properties of the inventive films 1 and 2 are listed in Table III.

Comparative Example A

Comparative Example A, a linear low density polyethylene, was made via a triethylaluminum cocatalyst under the same conditions as the Inventive Example 1. The properties of Comparative Example A are listed in Table I. The Comparative Example A was processed via blown film extrusion process, as described above. The blown film extrusion process conditions are listed in Table II. The Comparative Example A was melt extruded through an annular circular die. The hot melt emerged from the die thereby forming a tube. The tube was expanded by air, and at the same time, the cooled air chilled the web to a solid state. The film tube was then collapsed within a V-shaped frame of rollers and was nipped at the end of the frame to trap the air within the bubble. The nip rolls also drew the film away from the die. The tube was slit and wound as a single-film layer onto a roll. The properties of the comparative film A are listed in Table III.

Comparative Example B

Comparative Example B is a commercially available linear low density polyethylene, DOWLEX™ 2045G, available from the Dow Chemical Company. The properties of DOWLEX™ 2045G are listed in Table I. The DOWLEX™

2045G was processed via blown film extrusion process, as described above. The blown film extrusion process conditions are listed in Table II. The DOWLEX™ 2045G was melt extruded through an annular circular die. The hot melt emerged from the die thereby forming a tube. The tube was expanded by air, and at the same time, the cooled air chilled the web to a solid state. The film tube was then collapsed within a V-shaped frame of rollers and was nipped at the end of the frame to trap the air within the bubble. The nip rolls also drew the film away from the die. The tube was slit and wound as a single-film layer onto a roll. The properties of the comparative film B are listed in Table III.

Comparative Example C

Comparative Example C, a linear low density polyethylene, was made via a triethylaluminum cocatalyst under the same conditions as the Inventive Example 2. The properties of Comparative Example C are listed in Table I. The Comparative Example C was processed via blown film extrusion process, as described above. The blown film extrusion process conditions are listed in Table II. The Comparative Example C was melt extruded through an annular circular die. The hot melt emerged from the die thereby forming a tube. The tube was expanded by air, and at the same time, the cooled air chilled the web to a solid state. The film tube was then collapsed within a V-shaped frame of rollers and was nipped at the end of the frame to trap the air within the bubble. The nip rolls also drew the film away from the die. The tube was slit and wound as a single-film layer onto a roll. The properties of the comparative film C are listed in Table III.

Test Methods

Test methods employed herein include the following:
Density (g/cm$^3$) was measured according to ASTM-D 792-03, Method B, in isopropanol. Specimens were measured within 1 hour of molding after conditioning in the isopropanol bath at 23° C. for 8 min to achieve thermal equilibrium prior to measurement. The specimens were compression molded according to ASTM D-4703-00 Annex A with a 5 min initial heating period at about 190° C. and a 15° C./min cooling rate per Procedure C. The specimen was cooled to 45° C. in the press with continued cooling until "cool to the touch."

Melt Index ($I_2$) (dg/minutes) was measured at 190° C. under a load of 2.16 kg according to ASTM D-1238-03.

Melt Index ($I_{10}$) (dg/minutes) was measured at 190° C. under a load of 10.0 kg according to ASTM D-1238-03.

Branching distributions were determined via crystallization analysis fractionation (CRYSTAF); described herein below. Crystallization analysis fractionation (CRYSTAF) was conducted via a CRYSTAF 200 unit commercially available from PolymerChar, Valencia, Spain. The samples were dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector was used to measure the polymer solution concentrations. The cumulative soluble concentration was measured as the polymer crystallizes while the temperature was decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Solubility Distribution Breadth Index (SBDI) is the statistical value for the breadth of the CRYSTAF method which is calculated based on the following formula:

$$SDBI = \int \{\text{fourth root}\} \sqrt{(T-T_w)^4 \cdot w(T) dT}$$

$$T_w = \int T \cdot w(T) dT$$

$$\int w(T) dT = 1$$

wherein T is temperature, W is weight fraction, and $T_W$ weight average temperature.

Long Chain Branching was determined according to the methods known in the art, such as gel permeation chromatography coupled with low angle laser light scattering detector (GPC-LALLS) and gel permeation chromatography coupled with a differential viscometer detector (GPC-DV).

Weight average molecular weight ($M_w$) and number average molecular weight ($M_n$) were determined according to methods known in the art using conventional GPC, as described in further details hereinbelow.

The gel permeation chromatographic system consists of either a Polymer Laboratories Model PL-210 or a Polymer Laboratories Model PL-220 instrument. The column and carousel compartments were operated at 140° C. Three Polymer Laboratories 10-micron Mixed-B columns were used. The solvent was 1,2,4 trichlorobenzene. The samples were prepared at a concentration of 0.1 grams of polymer in 50 milliliters of solvent containing 200 ppm of butylated hydroxytoluene (BHT). Samples were prepared by agitating lightly for 2 hours at 160° C. The injection volume used was 100 microliters and the flow rate was 1.0 ml/minute.

Calibration of the GPC column set was performed with 21 narrow molecular weight distribution polystyrene standards with molecular weights ranging from 580 to 8,400,000, arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80° C. with gentle agitation for 30 minutes. The narrow standards mixtures were run first and in order of decreasing highest molecular weight component to minimize degradation. The polystyrene standard peak molecular weights were converted to polyethylene molecular weights using the following equation (as described in Williams and Ward, *J. Polym. Sci., Polym. Let.*, 6, 621 (1968)): $M_{polyethylene} = 0.431 (M_{polystyrene})$.

Polyethylene Equivalent Molecular Weight Calculations were Performed Using Viscotek TriSEC software Version 3.0.

High Density Fraction (percent) was measured via analytical temperature rising elution fractionation analysis (as described in U.S. Pat. No. 4,798,081 and abbreviated herein as "ATREF"), which is described in further details hereinafter. Analytical temperature rising elution fractionation (ATREF) analysis was conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed was dissolved in trichlorobenzene and allowed to crystallize in a column containing an inert support (stainless steel shot) by slowly reducing the temperature to 20° C. at a cooling rate of 0.1° C./min. The column was equipped with an infrared detector. An ATREF chromatogram curve was then generated by eluting the crystallized polymer sample from the column by slowly increasing the temperature of the eluting solvent (trichlorobenzene) from 20 to 120° C. at a rate of 1.5° C./min.

Haze was determined according to ASTM-D 1003.

Gloss 45° was determined according to ASTM-2457.

Elmendorf Tear Resistance was measured according to ASTM-D 1922.

Puncture strength was measured according to ASTM D 5748-95 except that the probe is a 0.5 inch polished stainless steel ball and the maximum travel distance is 7.5 inches.

Dart Impact Strength was measured according to ASTM-D 1709-04, Method A.

Rheology was measured using Dynamic Mechanical Spectroscopy (DMS). DMS experiments were conducted at 190° C. on a Rheometrics ARES equipped with 25 mm parallel plates and nitrogen purge. The frequency was varied between 0.1 and 100 rad/s. The strain amplitude was adjusted based upon the response of the samples between 4 and 8%. The stress response was analyzed in terms of amplitude and phase, from which the dynamic viscosity ($\eta^*$) and tan($\delta$) were calculated. The viscosity ratio (0.1 rad*s$^{-1}$/100 rad* s$^{-1}$) was determined to be the ratio of the viscosity measured at a shear rate of 0.1 rad/s to the viscosity measured at a shear rate of 100 rad/s.

Vinyl unsaturations were measured according to ASTM D-6248-98.

The present invention may be embodied in other forms without departing from the spirit and the essential attributes thereof, and, accordingly, reference should be made to the appended claims, rather than to the foregoing specification, as indicating the scope of the invention.

TABLE I

| Measurement | Method | Units | Inventive Example 1 | Comparative Example A | Comparative Example B | Inventive Example 2 | Comparative Example C |
|---|---|---|---|---|---|---|---|
| Density | ASTM-D 972 | g/cm³ | 0.9199 | 0.9204 | 0.9203 | 0.911 | 0.913 |
| I$_2$ | ASTM-D 1238 | dg/min | 0.91 | 0.93 | 1.02 | 1.0 | 1.04 |
| I$_{10}$/I$_2$ | — | unitless | 7.13 | 7.98 | 8.01 | 7.53 | 7.86 |
| High Density Fraction | ATREF-DV | % | 16.6 | 20.8 | 15.8 | 17.3 | 18.6 |
| SBDI | CRYSTAF | ° C. | 17.4 | 17.9 | 17.9 | 20.9 | 21.1 |
| Mn | GPC | g/mol | 34100 | 31300 | 29900 | 31000 | 28210 |
| Mw | GPC | g/mol | 117200 | 121100 | 117300 | 117000 | 119400 |
| Mz | GPC | g/mol | 303500 | 362000 | 367800 | 309900 | 361000 |
| Mw/Mn | GPC | unitless | 3.44 | 3.87 | 3.92 | 3.77 | 4.23 |
| Mz/Mw | GPC | unitless | 2.59 | 2.99 | 3.14 | 2.64 | 3.02 |
| Vinyl Unsaturations | IR | per 1000 C's | 0.28 | 0.36 | 0.40 | 0.26 | 0.32 |
| Viscosity ratio (0.1 rad*s$^{-1}$/ 100 rad*s$^{-1}$) | DMS | unitless | 4.6 | 5.5 | 5.4 | 4.7 | 5.0 |

TABLE II

| Measurement | Method | Units | Inventive Example 1 | Comparative Example A | Comparative Example B | Inventive Example 2 | Comparative Example C |
|---|---|---|---|---|---|---|---|
| Air Temp @ ring | Blown Film | ° F. | 47 | 47 | 47 | 48 | 47 |
| Amperage | Blown Film | % Full Load Current | 55 | 53.4 | 53.3 | 54.8 | 52.8 |
| Line Speed | Blown Film | ft/min | 81.8 | 81.7 | 82.1 | 79.5 | 81.1 |
| Melt Pressure | Blown Film | psi | 3900 | 3770 | 3730 | 3970 | 3520 |
| Melt Temperature | Blown Film | ° F. | 472 | 464 | 461 | 465 | 458 |
| RPM | Blown Film | rpm | 89 | 86.2 | 82.9 | 86.7 | 86.7 |
| Rate | Blown Film | lb/hr | 188.4 | 188.4 | 188.4 | 188.1 | 188.6 |

TABLE III

| Measurement | Method | Units | Inventive Example 1 | Comparative Example A | Comparative Example B | Inventive Example 2 | Comparative Example C |
|---|---|---|---|---|---|---|---|
| Film Thickness | Blown Film | mil | 2.05 | 2.05 | 2.04 | 2.10 | 2.05 |
| Normalized Dart Impact Strength A | ASTM-D 1709 | g/mil | 241 | 187 | 196 | 292 | 212 |

TABLE III-continued

| Measurement | Method | Units | Inventive Example 1 | Comparative Example A | Comparative Example B | Inventive Example 2 | Comparative Example C |
|---|---|---|---|---|---|---|---|
| Puncture Strength | DOW Method 101588 | Ft-lb/in³ | 235.72 | 185.86 | 251.42 | 113 | 105 |
| Normalized Elmendorf Tear Resistance In The Machine Direction | ASTM-D 1922 | g/mil | 411 | 459.7 | 452.2 | 495 | 516 |
| Gloss 45° | ASTM-D 2457 | gloss | 80 | 70.47 | 68.01 | 73 | 64 |
| Haze (including both internal and external haze) | ASTM-D 1003 | % | 5.87 | 8.1 | 8.28 | 9.7 | 11.7 |

We claim:

1. A polyethylene film comprising:
at least one heterogeneously branched ethylene/α-olefin copolymer, wherein said heterogeneously branched ethylene/α-olefin copolymer was obtained via polymerization of ethylene and one or more α-olefins in the presence of a multi-constituent catalyst system in a single reactor, wherein said multi-constituent catalyst system comprises a magnesium and titanium containing pro-catalyst and a cocatalyst, wherein said cocatalyst is a modified alkyl aluminum compound, wherein said heterogeneously branched ethylene/α-olefin copolymer having a density in the range of about 0.910 to about 0.930 g/cm³, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8;
wherein said film having a normalized dart impact strength of equal or greater than (6666-7012*density) g/mil, a normalized tear strength of equal or greater than $$\left(440 * e^{\frac{-(density-0.915)^2}{2*(0.00949)^2}}\right)$$

g/mil, and a haze in the range of 3 to 10 percent.

2. The polyethylene film according to claim 1, wherein said film having a thickness in the range of 10 to 75 μm.

3. The polyethylene film according to claim 1, wherein said film having a normalized dart impact strength of equal or greater than (6690-7012*density) g/mil, a normalized tear strength of equal or greater than $$\left(470 * e^{\frac{-(density-0.915)^2}{2*(0.00949)^2}}\right)$$

g/mil, and a haze in the range of 3 to 8 percent.

4. The polyethylene film according to claim 1, wherein said heterogeneously branched ethylene/α-olefin copolymer being an ethylene-1-octene copolymer.

5. An article comprising the polyethylene film of claim 1.

6. The article according to claim 5, wherein said film having a thickness in the range of 10 to 75 μm.

7. The article according to claim 5, wherein said film having a normalized dart impact strength of equal or greater than (6690-7012*density) g/mil, a normalized tear strength of equal or greater than $$\left(470 * e^{\frac{-(density-0.915)^2}{2*(0.00949)^2}}\right)$$

g/mil, and a haze in the range of 3 to 8 percent.

8. The article according to claim 5, wherein said heterogeneously branched ethylene/α-olefin copolymer being an ethylene-1-octene copolymer.

9. A method of producing a polyethylene film comprising the steps of:
providing at least one heterogeneously branched ethylene/α-olefin copolymer, wherein said heterogeneously branched ethylene/α-olefin copolymer was obtained via polymerization of ethylene and one or more α-olefins in the presence of a multi-constituent catalyst system in a single reactor, wherein said multi-constituent catalyst system comprises a magnesium and titanium containing pro-catalyst and a cocatalyst, wherein said cocatalyst is a modified alkyl aluminum compound, wherein said heterogeneously branched ethylene/α-olefin copolymer has a density in the range of about 0.910 to about 0.930 g/cm³, a molecular weight distribution in the range of about 2.8 to 3.8, a melt index ($I_2$) in the range of about 0.3 to about 4 g/10 min, and an $I_{10}/I_2$ ratio in the range of 6.5 to about 7.8;
processing said heterogeneously branched ethylene/α-olefin copolymer via blown film extrusion process or cast film extrusion process; and
thereby forming said film having a normalized dart impact strength of equal or greater than (6666-7012*density) g/mil, a $$\left(440 * e^{\frac{-(density-0.915)^2}{2*(0.00949)^2}}\right)$$

normalized tear strength of equal or greater than g/mil, and a haze in the range of 3 to 10 percent.

10. A multilayer film comprising at least one polyethylene film of claim 1.

* * * * *